(12) United States Patent
Bardzil et al.

(10) Patent No.: US 7,426,577 B2
(45) Date of Patent: Sep. 16, 2008

(54) DETECTION OF LOAD BALANCED LINKS IN INTERNET PROTOCOL NETWOKS

(75) Inventors: Timothy J. Bardzil, Boulder, CO (US); Alastair J. Rankine, Boulder, CO (US); Bruce W. Hill, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 943 days.

(21) Appl. No.: 10/601,158

(22) Filed: Jun. 19, 2003

(65) Prior Publication Data

US 2004/0260755 A1    Dec. 23, 2004

(51) Int. Cl.
G06F 15/16    (2006.01)
G06F 15/173   (2006.01)

(52) U.S. Cl. .................. 709/248; 709/238; 709/241

(58) Field of Classification Search ............... 709/223, 709/238, 239, 241, 248
See application file for complete search history.

(56) References Cited

U.S. PATENT DOCUMENTS

| | | | |
|---|---|---|---|
| 4,556,972 A | 12/1985 | Chan et al. | |
| 4,644,532 A | 2/1987 | George et al. | 370/94 |
| 5,136,690 A | 8/1992 | Becker et al. | 395/161 |
| 5,185,860 A | 2/1993 | Wu | |
| 5,226,120 A | 7/1993 | Brown et al. | |
| 5,450,408 A | 9/1995 | Phaal | 370/85.13 |
| 5,557,745 A | 9/1996 | Perlman et al. | 395/200.02 |
| 5,564,048 A | 10/1996 | Eick et al. | 395/600 |
| 5,572,650 A | 11/1996 | Antis et al. | 395/356 |
| 5,581,797 A | 12/1996 | Baker et al. | 395/326 |
| 5,596,703 A | 1/1997 | Eick et al. | 395/326 |
| 5,623,590 A | 4/1997 | Becker et al. | 395/326 |
| 5,636,350 A | 6/1997 | Eick et al. | 395/256 |
| 5,644,692 A | 7/1997 | Eick | 395/326 |
| 5,734,824 A | 3/1998 | Choi | 395/200.11 |

(Continued)

FOREIGN PATENT DOCUMENTS

EP    0 455 402    11/1991

(Continued)

OTHER PUBLICATIONS

J. Case, "A Simple Network Management Protocol," Network Working Group, Request for Comments 1067 (Aug. 1988) pp. 1-33.

(Continued)

*Primary Examiner*—Ario Etienne
*Assistant Examiner*—Sargon N Nano
(74) *Attorney, Agent, or Firm*—Sheridan Ross P.C.

(57) ABSTRACT

A system is provided that includes a memory 204 comprising a baseline topology 216; and a processor 208 that selects, from the baseline topology 216, first and second addresses associated with first and second routers 224 and 228, respectively, wherein the first router 224 has an associated first hop count relative to a selected node 200 and the second router 228 an associated higher second hop count relative to the selected node 200, transmit test packets having a time to live equal to or greater than the first hop count, receive responses associated with the test packets, and determine, based on the response, whether load balancing is in effect at the first router 224.

37 Claims, 6 Drawing Sheets

U.S. PATENT DOCUMENTS

| | | | |
|---|---|---|---|
| 5,737,526 A | | 4/1998 | Periasamy et al. |
| 5,751,971 A | * | 5/1998 | Dobbins et al. ............. 709/238 |
| 5,805,593 A | | 9/1998 | Busche ........................ 370/396 |
| 5,812,763 A | | 9/1998 | Teng |
| 5,850,397 A | * | 12/1998 | Raab et al. .................. 370/392 |
| 5,881,051 A | * | 3/1999 | Arrowood et al. ........... 370/248 |
| 5,881,246 A | * | 3/1999 | Crawley et al. ............. 709/238 |
| 5,943,317 A | | 8/1999 | Brabson et al. ............. 370/238 |
| 5,966,513 A | | 10/1999 | Horikawa et al. ...... 370/200.53 |
| 6,047,330 A | * | 4/2000 | Stracke, Jr. ................. 709/238 |
| 6,088,451 A | | 7/2000 | He et al. |
| 6,108,702 A | | 8/2000 | Wood |
| 6,119,171 A | * | 9/2000 | Alkhatib ..................... 709/245 |
| 6,122,639 A | | 9/2000 | Babu et al. |
| 6,131,117 A | | 10/2000 | Clark et al. |
| 6,249,820 B1 | * | 6/2001 | Dobbins et al. ............. 709/238 |
| 6,252,856 B1 | | 6/2001 | Zhang |
| 6,256,675 B1 | * | 7/2001 | Rabinovich ................. 709/241 |
| 6,269,398 B1 | | 7/2001 | Leong et al. |
| 6,269,400 B1 | | 7/2001 | Douglas et al. |
| 6,275,492 B1 | * | 8/2001 | Zhang ......................... 370/392 |
| 6,282,404 B1 | | 8/2001 | Linton |
| 6,298,381 B1 | * | 10/2001 | Shah et al. .................. 709/228 |
| 6,360,255 B1 | | 3/2002 | McCormack et al. ....... 709/221 |
| 6,377,987 B1 | | 4/2002 | Kracht |
| 6,405,248 B1 | | 6/2002 | Wood .......................... 709/223 |
| 6,418,476 B1 | * | 7/2002 | Luciani ....................... 709/238 |
| 6,430,612 B1 | | 8/2002 | Iizuka ......................... 709/223 |
| 6,442,144 B1 | | 8/2002 | Hansen et al. |
| 6,456,306 B1 | | 9/2002 | Chin et al. .................. 345/810 |
| 6,466,121 B1 | * | 10/2002 | Shah ........................... 709/224 |
| 6,550,012 B1 | | 4/2003 | Villa et al. |
| 6,744,739 B2 | * | 6/2004 | Martin ........................ 370/254 |
| 6,859,878 B1 | | 2/2005 | Kerr et al. |
| 6,895,436 B1 | | 5/2005 | Caillau et al. |
| 6,952,779 B1 | | 10/2005 | Cohen et al. |
| 7,131,140 B1 | * | 10/2006 | O'Rourke et al. ............. 726/11 |
| 7,133,929 B1 | * | 11/2006 | Shah ........................... 709/241 |
| 7,143,184 B1 | * | 11/2006 | Shah et al. .................. 709/241 |
| 7,185,100 B2 | * | 2/2007 | Shah ........................... 709/230 |
| 7,200,673 B1 | * | 4/2007 | Augart ........................ 709/238 |
| 2001/0034837 A1 | | 10/2001 | Kausik et al. |
| 2001/0049786 A1 | | 12/2001 | Harrison et al. ............. 713/156 |
| 2002/0087704 A1 | | 7/2002 | Chesnais et al. ............. 709/228 |
| 2002/0112062 A1 | | 8/2002 | Brown et al. ................ 709/229 |
| 2002/0116647 A1 | | 8/2002 | Mont et al. .................. 713/201 |
| 2002/0128885 A1 | | 9/2002 | Evans |
| 2002/0141593 A1 | | 10/2002 | Kurn et al. |
| 2002/0144149 A1 | | 10/2002 | Hanna et al. ................ 713/201 |
| 2002/0161591 A1 | | 10/2002 | Danneels et al. ............... 705/1 |
| 2002/0188708 A1 | | 12/2002 | Takahashi et al. |
| 2003/0004840 A1 | | 1/2003 | Gharavy |
| 2003/0043820 A1 | | 3/2003 | Goringe et al. ............. 370/254 |
| 2003/0065626 A1 | | 4/2003 | Allen |
| 2003/0065940 A1 | | 4/2003 | Brezak et al. |
| 2003/0065944 A1 | * | 4/2003 | Mao et al. ................... 713/201 |
| 2003/0084176 A1 | | 5/2003 | Tewari et al. |
| 2003/0163686 A1 | | 8/2003 | Ward et al. |
| 2005/0071469 A1 | * | 3/2005 | McCollom et al. .......... 709/225 |

FOREIGN PATENT DOCUMENTS

| | | |
|---|---|---|
| JP | 7-334445 | 12/1995 |
| JP | 11-340995 | 12/1999 |
| JP | 2000-32132 | 1/2000 |
| JP | 2000-101631 | 4/2000 |
| JP | 2000-83057 | 9/2000 |
| JP | 2001-94560 | 4/2001 |
| JP | 2001-144761 | 5/2001 |

OTHER PUBLICATIONS

John the Ripper v1.3, printed from the Dec. 25, 2001 web archive of http://web.textfiles.com/computers/john.txt/.

Matt Bishop et al., "Improving Security via Proactive Password Checking," Computers and Security, 14(3) (1995), pp. 233-249.

Novotney, J. et al. "An Online Credential Repository for the Grid: MYProxy" from High Performance Distributed Computing, 2001 Proceedings. Lawrence Berkely Lab. CA USA pp. 104-111 Aug. 7-9, 2001. see pp. 1087-110 sections 4-6.

"Computer & Network LAN" vol. 18, No. 1, pp. 47-57 (Relevance described in Japanese Patent Office's First Office Action for Japanese Patent App. No. 2003/527620 mailed Sep. 11, 2006).

Y. Breitbart et al., "Topology Discovery in Heterogeneous IP Networks," Proceedings of IEEE Infocom 2000 (Mar. 2000), 10 pages.

B. Huffaker et al., "Topology Discovery by Active Probing," CAIDA (2000), 8 pages.

M.R. Meiss et al., "Standards-Based Discovery of Switched Ethernet Topology," Advanced Network Management Lab, (Apr. 2002), pp. 1-20.

R. Siamwalla et al., "Discovering Internet Topology, " Cornell University (Jul. 1998), pp. 1-16.

NET-SNMP, The NET-SNMP Project Home Page, Dec. 13, 2000, 5 pages, http://net-snmp.sourceforge.net.

OpenSSL, The Open Source Toolkit for SSL/TLS, Apr. 17, 2002, 2 pages, http://www.openssl.org.

Network Working Group, Management Information Base for Network Management of TCP/IP-based Internets: MIB-II, Mar. 1991, 62 pages, http://www.ietf.org/rfc/rfc1213.txt.

Network Working Group, The OSPF NSSA Option, Mar. 1994, 15 pages, http://www.ietf.org/rfc/rfc1587.txt.

Network Working Group, OSPF Version 2, Apr. 1998, 191 pages, http://www.ietf.org/rfc/rfc2328.txt.

Network Working Group OSPF Version 2 Management Information Base, Nov. 1995, 71 pages, http://www.letf.org/rfc/rfc1850.txt.

Network Working Group, RIP Version 2, Nov. 1998, 35 pages, http://www.ierf.org/rfc/rfc2453.txt.

Moy, J., Network Working Group, OSPF Version 2, Mar. 1994, pp. 61-76, 85-95.

Jason Novotny et al., "An Online Credential Respository for the Grid: MyProxy" from High Performance Distributed Computing, 2001 Proceedings, Berkely, CA (Aug. 2001), pp. 104-111.

Packet Design CNS, "Route Explorer™ Simplifying Route Analysis", undated, 4 pages, date unavailable.

Packet Design, Inc., "Route Explorer™—Reports, Alerts, and Queries", undated, 2 pages, date unavailable.

Harvey B. Newman, [Henp-net-1] Network Monitoring—Route Explorer (complementary to SNMP?), May 29, 2002, avaliable at http://lists.bnl.gov/pipermall/henp-net-1/2002-May/000156.html, 3 pages.

Jim Duffy, "Head In the Clouds," *The Edge*, May 24, 2002, avaliable at http://www.nwfusion.com/edge/columnists/2002/0520edge2.html, 3 pages.

Scott Tyler Shafer, "Packet Design Unveils Layer 3 Switch," *InfoWorld*, May 20, 2002, available at http://www.infoworld.com/article/02/05/20/020520hnestrin__1.html, 2 pages.

Moy, J., OSPF Version 2 Memorandum to Network Working Group, Mar. 1994, 2 pages.

Japanese Patent Office's First Office Action for Japanese Patent App. No. 2003/527620 mailed Sep. 11, 2006.

* cited by examiner

DETECTION OF LOAD BALANCED LINKS IN INTERNET PROTOCOL NETWOKS

CROSS REFERENCE TO RELATED APPLICATIONS

Cross-reference is made to U.S. patent application Ser. Nos. 10/127,888, filed Apr. 22, 2002, entitled "Topology Discovery by Partitioning Multiple Discovery Techniques", to Goringe, et al., and Ser. No. 10/127,967, filed Apr. 22, 2002, entitled "Using Link State Information to Discover IP Network Topology", to Goringe, et al., each of which contains subject matter related to the subject matter of the present application and is incorporated herein by this reference.

FIELD OF THE INVENTION

The present invention relates generally to network topology and specifically to ascertaining network topology in load balanced networks.

BACKGROUND OF THE INVENTION

The topology of a distributed processing network, such as an Internet Protocol network, is information with many potential uses in troubleshooting, administration, planning, and other tasks. "Topology" refers generally to the patterns of connection between the various machines in a network, and "topology information" refers to the body of information associated therewith. Complete and accurate network topology information can predict the path of an individual packet through the network and hence identify the set of network devices, such as routers and their associated interfaces, involved. Incorrect or inaccurate information can lead to poor planning and/or administrative decisions, an inability to accurately measure network performance, and/or consumption of excessive resources in troubleshooting problems, particularly in IP telephony where jitter and packet round trip time can be crucial considerations.

Current solutions to the problem of topology discovery can be separated into two broad categories, namely Simple Network Management Protocol or SNMP-based and traceroute-based. The majority of current commercial products, such as Avaya ExpertNet™ and Hewlett Packard Open View™, use an SNMP-discovery mechanism to construct topology information. In this approach, topology information is obtained from the Management Information Base or MIB of one or more routers in the network segment or subnetwork of interest. The topology information in the MIB can, however, be incomplete and/or inaccurate. Neither of the two standardized routing tables available through SNMP, namely IpRouteTable (RFC1213) and IpCidrRouteTable (RFC 2096), are capable of containing the multiple routes, or redundant links, having the same metric or cost to a selected destination. Traceroute-based techniques are available on a number of major operating systems, such as Windows™, Unix, and Linux. Traceroute sends a series of Internet Control Message Protocol or ICMP packets, each with an increasing Time-To-Live or TTL, to a particular destination device. It then uses error messages that are returned from each router on-route when the TTL expires to construct the path to that destination. Although the traceroute technique can have an advantage over SNMP-based techniques, namely that traceroute takes into account the actual routing decisions that are made on packets traveling across the network, traceroute can return an incorrect path that is made up of some combination of two or more physically separate paths, particularly when load balancing is in effect.

Both techniques are generally unable to detect the existence of load balancing, let alone the type of load balancing, in effect along a route. With reference to FIG. 1, there are two redundant links or paths depicted, namely the first path from router 100 to router 104 to router 112 and the second path from router 100 to router 108 to router 112. The redundant links permit traffic to be distributed across the multiple routes to use network resources more efficiently. In per-packet load balancing, each outgoing packet is queued to a router interface in a round-robin fashion. In other words, a first packet is sent along the first path, a second (next) packet along the second path, a third (next) packet along the first path, and so on. This type of load balancing can cause voice telephony packets to arrive out of sequence at the destination, which appears to the destination as jitter. In per-destination load balancing, each router interface caches the destination address of each packet such that the next packet addressed to the same destination will be sent down the same interface. In per-source/destination load balancing, better usage of per-destination of load balancing is obtained by caching both the destination and the source address at each router interface. This ensures that the next packet with the same to/from address pair is sent down the same interface. Load balancing can not only be detrimental to IP telephony but also cause difficulties in measuring link characteristics as it can become difficult determining exactly to which link the measured characteristics correspond.

SUMMARY OF THE INVENTION

These and other needs are addressed by the various embodiments and configurations of the present invention. The present invention is directed generally to a system and method for detecting load balancing in a distributed processing network.

In one embodiment, a method for detecting load balancing in a distributed processing network is provided that includes the steps of:

(a) providing a baseline topology;

(b) selecting, from the baseline topology, first and second addresses associated with first and second routers, respectively, such that the first router has an associated first hop count relative to a selected node and the second router an associated second hop count relative to the selected node, with the first hop count being less than the second hop count;

(c) transmitting one or more (typically at least two) test packets, with each one test packet having a time to live equal to or greater than the second hop count;

(d) receiving one or more responses (e.g., TTL-expired error messages) associated with the test packets; and (e) determining, based on the responses, whether load balancing is in effect at the first router. These steps are performed iteratively preferably on subnetwork-by-subnetwork and router-by-router bases.

The step of selecting the first and second routers typically includes the additional steps of:

(i) selecting a (first) subnetwork;

(ii) identifying a first set of unique addresses within the selected (first) subnetwork; and (iii) creating a second set of unique addresses.

The second set of addresses is the union of the first set and a third set of router interface addresses associated with routers between the selected node and the selected subnetwork. The first and second addresses are included within the third set.

In configuring the test packets, the time to live is preferably equal to the second hop count and the second hop count preferably exceeds the first hop count by one hop. The test packets are typically transmitted from a common source node while the destination address in the packet headers is held constant for per-packet load balancing detection and varied for per-destination and per-source/destination load balancing detection. Load balancing is in effect when at least two different routers respond to the test packets.

In a typical application, the test packets for detecting per-packet load balancing are sent first, and the test packets for detecting per-destination or per-source/destination load balancing thereafter. The detection of per-packet load balancing before per-destination and per-source/destination load balancing can be important as otherwise it would be difficult to know what type of load balancing is detected by the first set of test packets.

The method can have a number of advantages over conventional topology discovery algorithms. For example, the present invention can not only generate an accurate and complete topology of a desired network segment or subnetwork but can also identify the existence of load balancing and determine the type of load balancing in existence. This knowledge can facilitate troubleshooting, administration, planning and other network related tasks. In particular in Voice Over IP or IP telephony, this knowledge can lead to substantial time and cost savings in post-installation in IP telephony troubleshooting.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Before discussing the configuration and operation of the present invention, it is important to understand certain features of many routing protocols. A router can be identified by a unique router ID in the case of certain protocols, and associated with a unique area ID. A router itself typically (but not always) has no IP address. Rather, the interfaces associated with the router generally have IP addresses. An interface is a logical device belonging to a host such as a router than can be the attachment point of a link. Typically, an interface will have zero or one IP address and belong to a network. The interface will normally have an interface number and a network mask. A link contains two or more bindings of a source interface and a metric or cost. It is templated by the metric representation which is specific to the routing protocol and represents the cost for a packet to leave an interface. A link is typically associated with a cost metric and a routing protocol identifier. A network object represents a data network or subnetwork. It has an address and a mask and represents an address space in which a set of hosts is contained. A network object may derive its address and/or its mask from its member interfaces.

The Network Topology Discovery System

Figure 1:
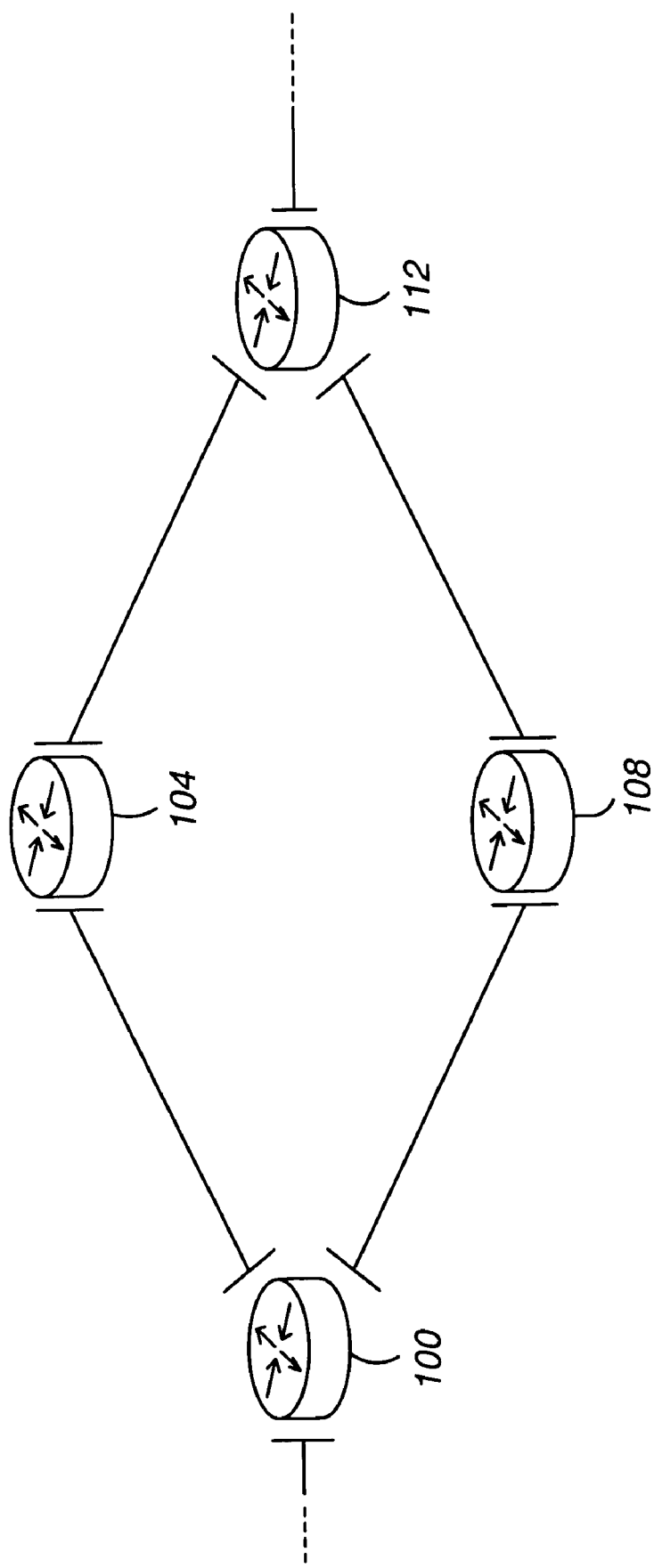
FIG. 1 is a block diagram of redundant links according to the prior art.
Figure 2:
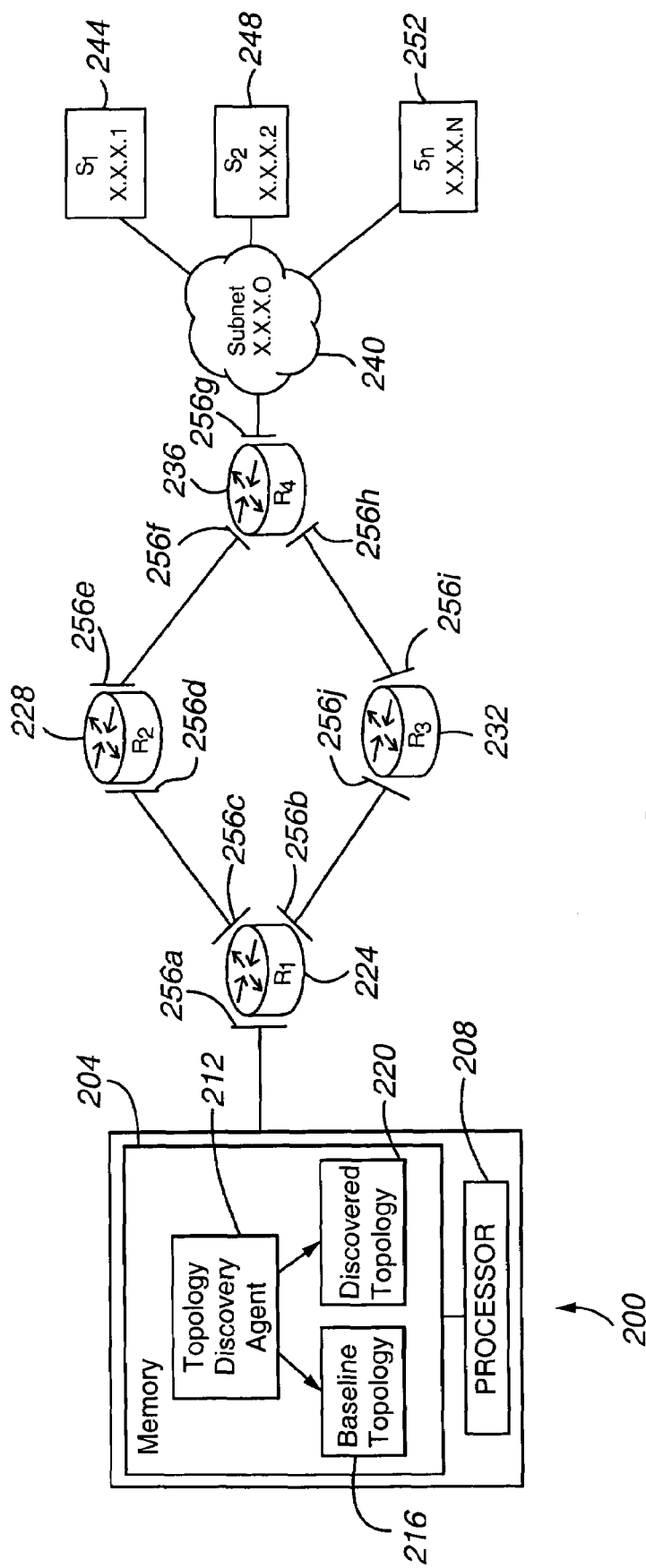
FIG. 2 is a block diagram of a hardware implementation of an embodiment of the present invention.

With this in mind, FIG. 2 illustrates an exemplary network topology discovery system 200 according to an embodiment of the present invention. The system 200 is configured to be connected to an access point of a computer network, such as to stub network, to send communications to and receive communications from hosts, typically routers. The system 200 is a software-controlled machine comprising a memory 204 and a processor 208. The memory can be any suitable type of information recording medium, such as magnetic, optical, and magnetoptical, configured as internal and/or external and/or primary and/or secondary storage. The processor can be any suitable microprocessor configured to run any suitable operating system, including MS-DOS, UNIX, MVS, OS/2, VM/SP, and WINDOWS™.

The memory 204 comprises a topology discovery agent 212 configured to determine not only network topology generally but also detect the existence of load balancing and the type of load balancing, a baseline topology 216 containing topology information to be used as the starting point in topology discovery and a discovered topology 220 containing topology information in the baseline topology and discovered during topology discovery.

The topology discovery agent 212 preferably, given the baseline topology, can construct a path to each of the network edges (or edge subnets) and represents the paths as a tree structure. Such trees are conceptually similar to the spanning tree structure for ethernet bridges or to IP multicast group trees. The output is a modified form of the output illustrated in FIG. 22 of copending U.S. patent application Ser. No. 10/127,888, supra. The agent 212 effects this result by using multiple invocations of traceroute (or traceroute-like) algorithm, first to detect the presence of per-packet load balancing and second to detect other forms of load balancing. As will be appreciated, the use of more invocations of traceroute per router/router interface, the greater the probability of detecting load balancing on that router/router interface. For example, if load balancing is to be detected on router $R_1$ 224 that is one hop away from the system 200 (the selected node), a test packet having a TTL of 2 (the number of hops to the subject router $R_1$ plus one more hop) is sent to a selected destination such that the packet will pass through the selected router $R_1$. Based on the TTL-expired response packets generated by router $R_2$ 228 and $R_3$ 232, the identity or address(es) associated with the (next) downstream router $R_2/R_3$ can be determined. After multiple similarly configured test packets are sent, per-packet load balancing at router $R_1$ can be identified by the presence of the different respondent routers $R_2$ and $R_3$. In a later invocation for the selected router, packets having the same TTL but different destination addresses are sent to identify the presence or absence of per-destination and per-source/destination load balancing.

Figure 4:
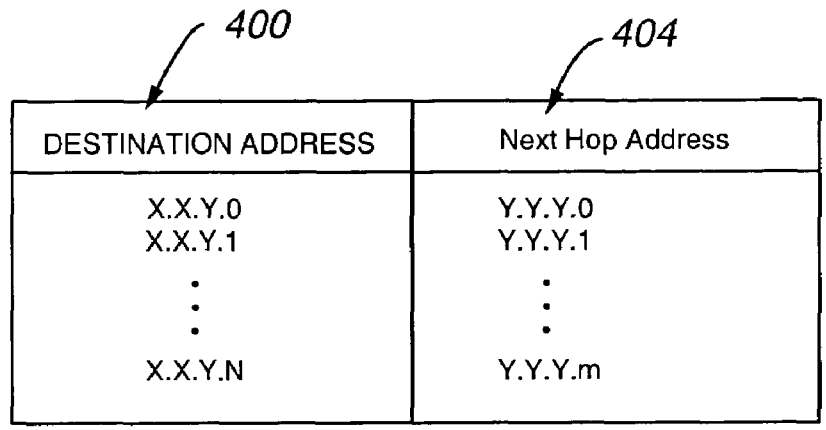
FIG. 4 depicts a simplified IpRouteTable according to a version of SNMP.

The baseline topology 216 is topology information collected and configured in any suitable manner. In one configuration, the baseline topology is obtained by accessing network device routing tables using SNMP IpRouteTable and/or IpCidrRouteTable entries. In this configuration, the topology information is possibly incomplete. FIG. 4 depicts a simplified baseline topology information obtained by these techniques. As can be seen from FIG. 4, the topology 216 comprises destination address 400 correlated with next hop address 404. In other words, the topology 216 provides the next hop address for each destination address on a received packet. As will be appreciated, there are some routes which are not contained in the topology information. In the baseline topology 216, there is such a table for each identified router (which is identified by a corresponding router identifier and/or one or more associated interface addresses). In another configuration, the baseline topology is obtained using standard traceroute techniques. As noted above, traceroute techniques alone can provide an incorrect topology, particularly where per-packet load balancing is in effect. In other configurations, the baseline topology is obtained using other techniques, such as described in copending U.S. Applications entitled "Using Link State Information to Discover IP Network Topology" and "Topology Discovery by Partitioning Multiple Discovery Techniques", identified above.

The discovered topology 220 is preferably in the form of a network tree that describes the set of paths accessible from the system 200. By way of illustration, FIG. 22 of Ser. No. 10/127,888 is presented in the form of a network tree with nodes and interconnecting links and a subnetwork clouds illustrated. The system 200 will normally be the root or trunk of the tree, the links the branches, and the edge hosts (or hosts at the network edges) the leaves of the tree. Nodes of the tree will be routers, or "clouds", namely sets of routers and paths for which per-packet load balancing was detected and for which no deterministic path could therefore by output. As noted, the agent 212 produces the tree by traversing the baseline topology starting from the system 200 and adding to the output tree as new routes are discovered. As will be appreciated, the discovered topology 220 can be rendered in any other desirable form, such as via a database or STL, a markup language such as Extensible Markup Language or XML, a proprietary file format, and the like.

The system 200 can include other modules (which are not shown). For example, the system 200 can include a metric measuring agent configured to measure delays, such as jitter and packet loss rate, experienced by packets traveling to and from each of the identified edge hosts in the network. When load balancing is in effect or otherwise present, the destination address of the directly connected upstream router is typically not varied when attempting to measure delays to/from intermediate routers. In other words, an intermediate router may not be pinged directly, as the path taken to that router may not be the expected one. A TTL-based method, similar to that used by traceroute techniques, is typically used to ping the intermediate routers for metric measurement. This approach will elicit an ICMP TTL-expired message when the ping packet reaches the intermediate router. As will be appreciated, the Uniform Datagram Protocol or UDP can also be used instead of or in addition to ICMP not only for metric measurement but also for load balancing detection. UDP packets are treated similarly to voice telephony or VoIP packets by most routers. By picking a UDP port which is typically not open on the edge host, a response can be elicited from the edge host, in the form of a port-unreachable ICMP error message.

Operation of the Topology Discovery Agent

Figure 3A:
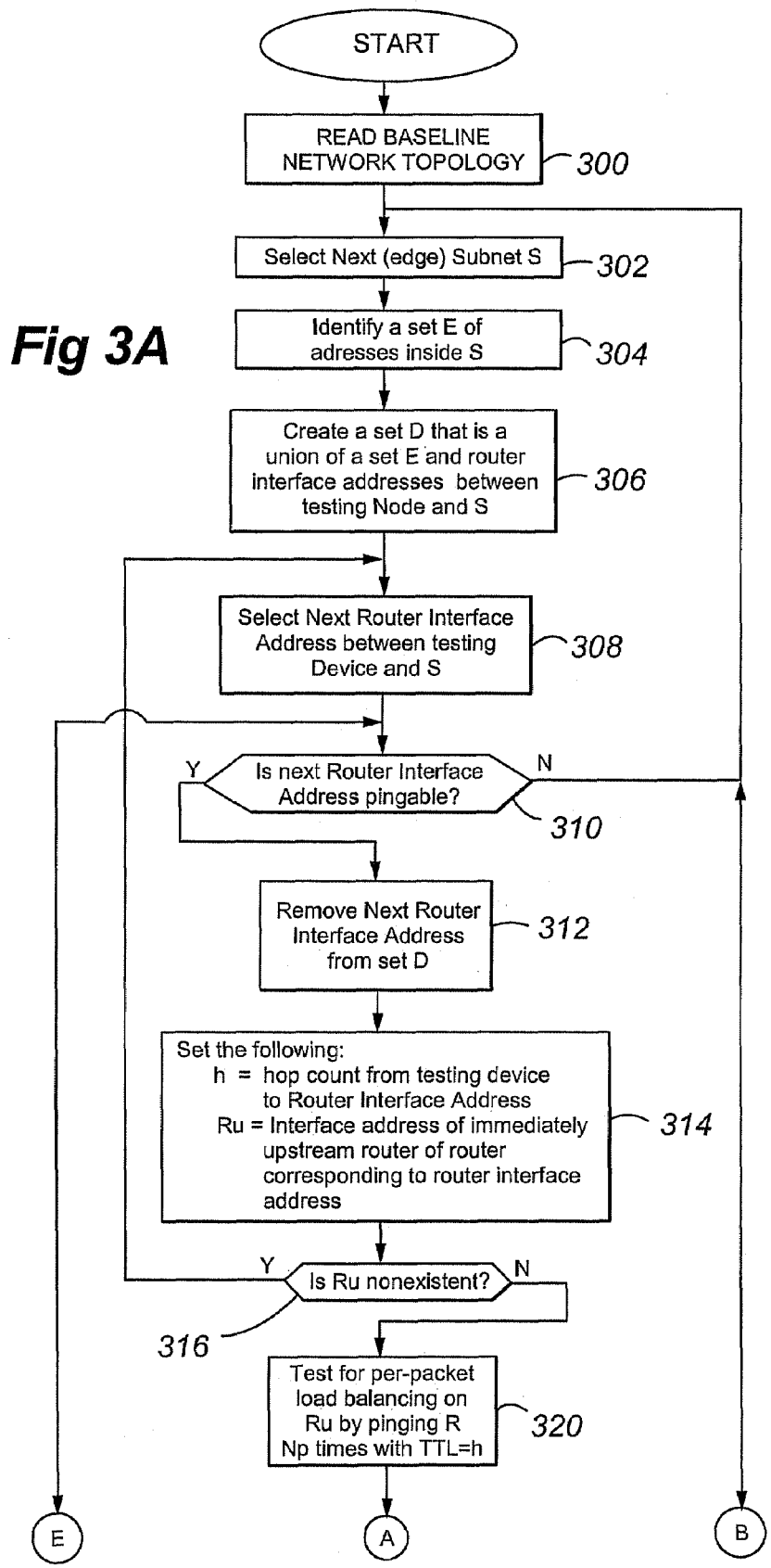
FIGS. 3A-C collectively are a flowchart of an operational embodiment of the topology discovery agent.
Figure 3B:
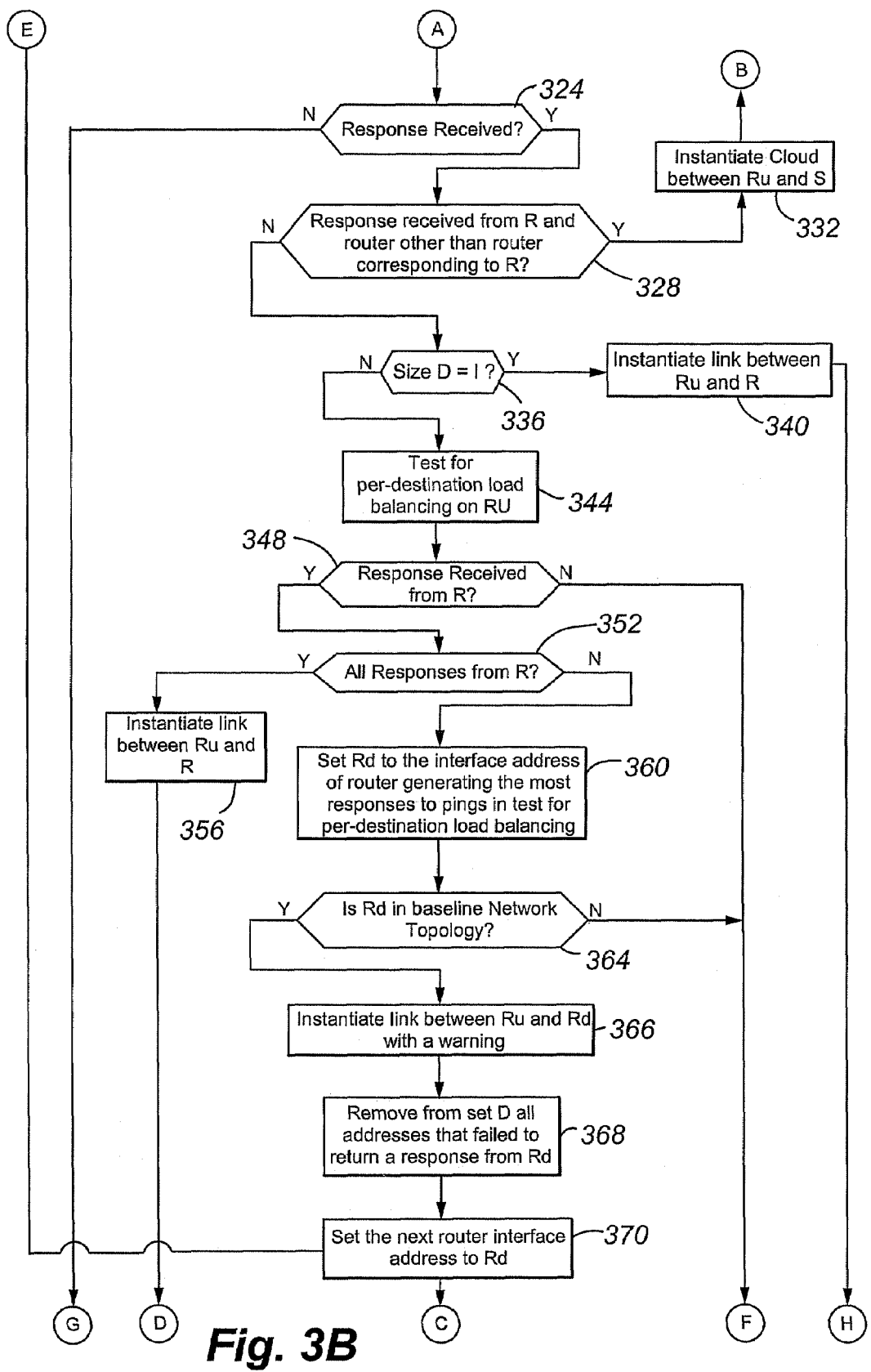
Figure 3C:
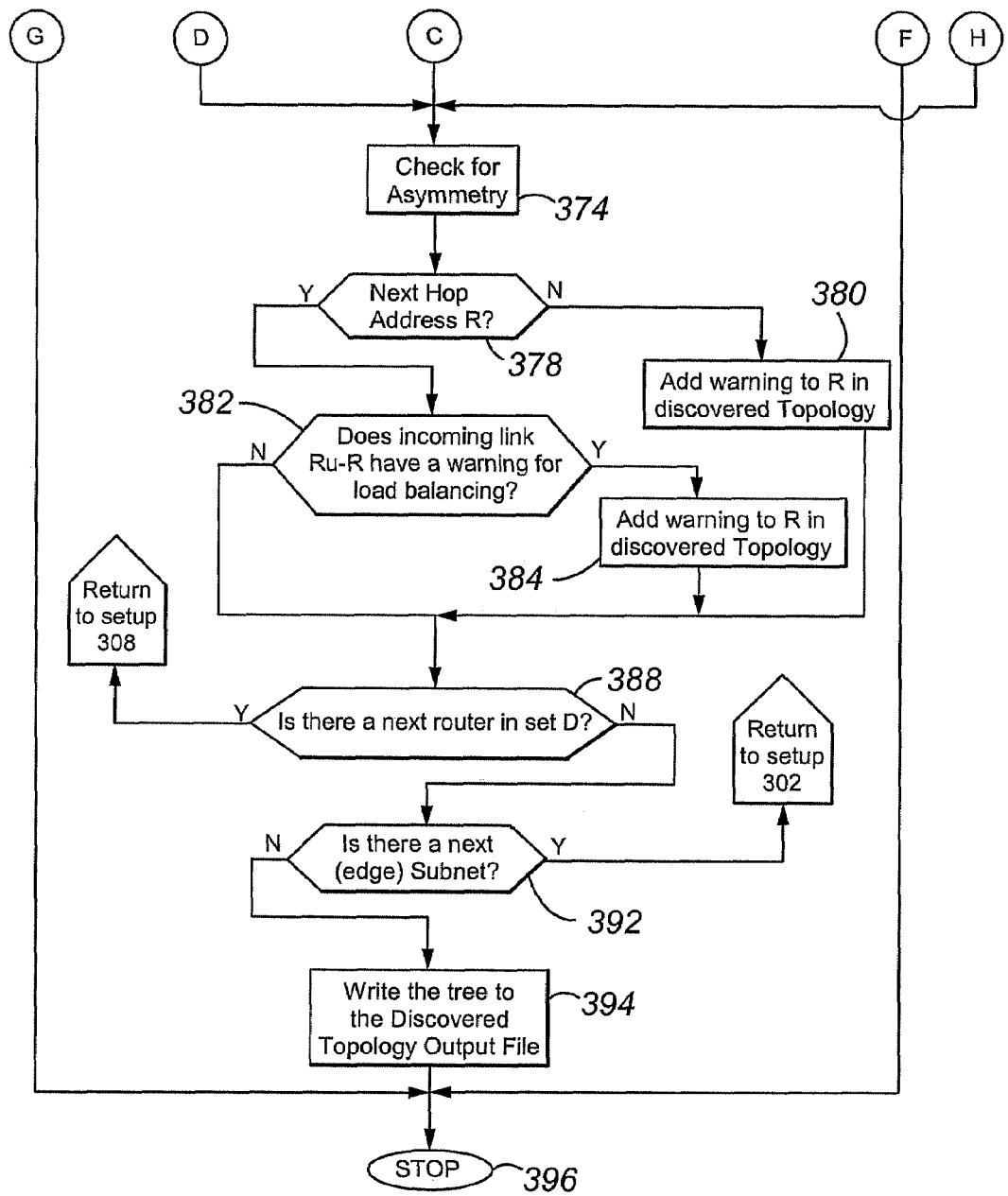

Referring to FIGS. 3A-C, the operation of the topology discovery agent 212 will now be discussed.

In step 300, the agent 212 reads the baseline topology 216 file, and generates a set S of subnet work addresses in the network topology. This can be effected based on the baseline topology. Typically, the baseline topology file includes a list of routers and, for each listed router, a table similar to the table of FIG. 4.

In step 302, a next subnet $S_i$ in the set S of subnets is selected, and in step 304 a (first) set E of device addresses inside $S_i$ are generated. The device addresses in set E can be determined based on the baseline topology and/or other topology discovery techniques. Additionally, the addresses can be generated by known techniques based on the selected subnet address as discussed in detail below. At minimum, the set E will include the interface address of the router upstream from the selected subnet. With reference to FIG. 2, the set E will include at minimum the interface of router $R_4$ 236.

In step 306, a (second) set D of addresses is created. The set D is the union of the device addresses in set E and the router interface addresses between the testing node or system 200 and the selected subnet $S_i$ (or a third set of unique addresses). With reference to FIG. 2, when the subnet 240 is $S_i$, set D includes the addresses of at least one associated interface 256a-j for each of routers $R_1$, $R_2$, $R_3$, and $R_4$. As will be appreciated, step 306 may be omitted. If a generated list of IP addresses is used (discussed infra), it is not necessary to construct the set D; instead, the addresses within set E are used.

In step 308, a next router interface address from set D is selected. The router interface address selected is preferably associated with the router immediately downstream from system 200.

In decision diamond 310, the router interface address is pinged by known techniques (e.g., by SNMP or ICMP) to determine if the interface address is valid, i.e., contactable. When the address is invalid, the agent 212 returns to step 302 above. To enable router utilization monitoring and baseline topology determination, SNMP and ping contactability are preferred for each router in the tree. If a router were not SNMP and ping contactable, the tree may be pruned at that point. SNMP contactability is normally not required for load balanced link detection alone. When the address is valid, the agent 212 proceeds to step 312.

In step 312, the agent 212 removes the selected and validated interface address and any associated interface address (for the selected router) from set D. Associated interface addresses exist where a given router has more than one contactable interface identified in the baseline topology.

In step 314, the agent 212 initializes and sets the following parameters:

(a) "h", or the hop count, is set equal to the hop count from the system 200 (or selected node) to the selected router interface address. For example, in FIG. 2 if the selected router interface address is an interface 256a of router $R_1$ 224 the hop count "h" is set to 1 (as the router $R_1$ is one hop from the system 200 while routers $R_2$ 228 and $R_3$ 232 are each two hops from system 200, and so on).

(b) "$R_u$", or an address associated with the immediately upstream router from the selected router, is set to an interface address of the immediately upstream router.

In decision diamond 316, it is determined if there is an address to which $R_u$ can be set. For example, if the initially selected router is router $R_1$, there is no router upstream of $R_1$ (as $R_1$ is the immediately downstream router from the system 200). In contrast if the selected router is router $R_2$ or $R_3$, the upstream router is $R_1$. In the event that there is no address corresponding to $R_u$, the agent 212 returns to step 308, selects the next downstream router, which in the configuration of FIG. 2 is either router $R_2$ or $R_3$, and repeats the above steps. In the event that there is an address corresponding to $R_u$, the agent 212 proceeds to step 320.

In step 320, the agent 212 tests for per-packet load balancing on $R_u$ by pinging the selected router a selected number ("Np") times with the Time To Live or TTL set to "h". Thus, for either router $R_2$ or $R_3$ as $R_u$, "h" is set to two. A higher probability that load balancing has been detected is associated with a higher value of Np. Typically, Np is set to ten, or ten test packets are sent, to provide a greater than 90% probability that load balancing will be detected on the selected router. The destination for the packet can be any destination downstream of the selected router as well as the address of the interface of the selected router itself. Referring to FIG. 2, if router $R_2$ or $R_3$, is selected the packet destination can be an interface address associated with the selected one of router $R_2$ 228 or $R_3$ 232 or router $R_4$ 236, the address x.x.x.0 of subnet 240, or any of the addresses of $S_1$ (244), $S_2$ (248), ... $S_n$ (252). To detect per-packet load balancing, only one destination address is typically employed and that destination address is preferably an edge subnet address.

In decision diamond 324, it is determined whether a response is received to any of the test packets from the selected router. If not, the baseline topology file 216 is deemed to be incorrect and the agent 212 proceeds to step 396 and terminates operation. Although it seems excessive to quit upon discovering inaccurate topology particularly if the router in question is attached to a relatively unimportant edge subnet, it is left to the user to sort out the problem as the network topology is probably fairly unstable or has changed since the baseline topology was acquired. If a response is received only from a router other than the selected router, the topology is nonetheless deemed to be incorrect. If a response is received from the selected router, the agent 212, proceeds to decision diamond 328.

Figure 5:
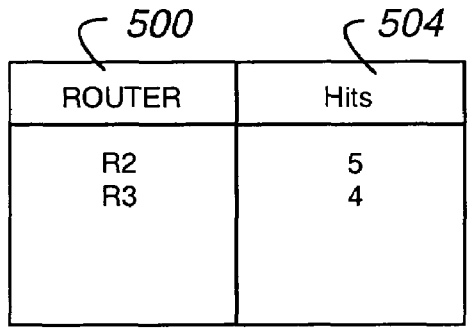
FIG. 5 depicts intermediate data structures for identifying per-packet load and per-source/destination load balancing.

In decision diamond 328, it is determined whether a response is received from a router other than the selected router. During transmission of the test packets a table similar to that of FIG. 5 is maintained. As can be seen from the figure (which depicts a per-packet load balancing test being performed on $R_1$ as the upstream router), the table has a column 500 for respondent router and a column 504 for the number of responses or hits. As will be appreciated, the TTL for each of the test packets in the table is maintained constant while the destination is varied. When there is only one router sending responses to the test packets, per-packet load balancing is not deemed to be in effect. When there is more than one router sending responses to the test packets (which is the case in FIG. 5), per-packet load balancing is deemed to be in effect. When per-packet load balancing is in effect, the agent 212 in step 332 instantiates a "cloud" between $R_u$ and the selected subnet and returns to step 302. A "cloud" is instantiated as further load balancing detection downstream of the selected router can provide an erroneous topology. When per-packet load balancing is not in effect, the agent 212 proceeds to decision diamond 336.

In decision diamond 336, the agent 212 determines whether the size or membership of set D is equal to (or less than) one. If only one member remains in set D, the agent 212 is typically unable to test for per-destination and per-source/destination load balancing; that is, the agent is unable to test for per-destination and per-source/destination load balancing when set D contains all known or predictable destination addresses downstream of the selected router. In that event, the agent in step 340 instantiates a link between $R_u$ and the selected router, with a warning indicating that per-destination and per-source/destination load balancing could not be tested for the associated link, and proceeds to step 374 discussed below. Whenever a link is instantiated, the agent 212 determines the input and output interfaces for each router. These are recorded in the tree for the purpose of router interface monitoring. If more than one member remains in set D, the agent 212 proceeds to step 344.

In step 344, the agent 212 tests for per-destination and per-source/destination load balancing on the upstream router $R_u$. This is typically effected by pinging all addresses in set D with the TTL equal to "h". Because the source address of the system 200 is generally constant among the test packets, per-destination and per-source/destination load balancing are effectively identical for purposes of detection and corrective action. In one configuration, other destination addresses are generated and used for test packets. Such addresses can be generated by selecting destination addresses off of the subnet address of subnet $S_i$. For example, as shown in FIG. 2, if the address x.x.x.0 for subnet 240 is known the addresses x.x.x.1 for destination $S_1$, x.x.x.2 for destination $S_2$, and x.x.x.n for destination $S_n$ can be determined. Even though the generated addresses may not be valid, they may still be used as the test packet, due to the TTL, will not reach the address. Alternatively or additionally, destination addresses can be obtained from the router table of last router before the destination, such as router $R_4$ in FIG. 2. As will be appreciated, the more destination addresses employed in test packet headers during load balancing detection means a higher probability of detecting per-destination and per-source/destination load balancing.

Figure 6:
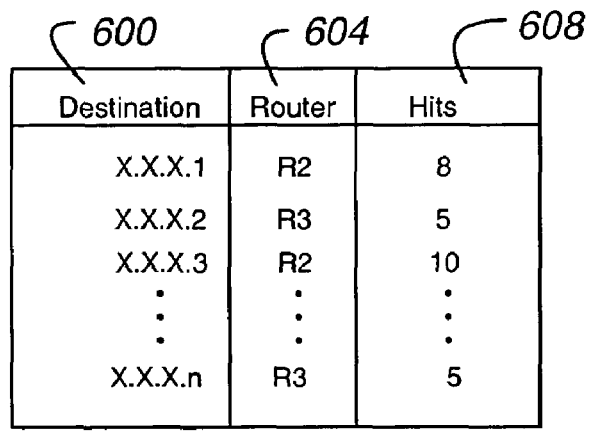
FIG. 6 depicts intermediate data structures for identifying per-destination load balancing.

During transmission of the test packets a table similar to that of FIG. 6 is maintained. As can be seen from the figure (which depicts a per-destination and per-source/destination load balancing test being performed on $R_1$ as the upstream router), the table has a column 600 for destination, a column 604 for respondent router, and a column 608 for number of responses or hits. When there is only one router sending responses to the test packets, per-destination and per-source/destination load balancing is not deemed to be in effect. As can be seen from FIG. 6, either per-destination or per-source/destination load balancing is in effect for the upstream router $R_1$ that is the subject for the test referenced therein.

In decision diamond 348, it is determined whether a response is received to any of the test packets from the selected router. If not, the baseline topology file is deemed to be incorrect and the agent 212 proceeds to step 396 and terminates operation. If a response is received only from a router other than the selected router, the topology is nonetheless deemed to be incorrect. If a response is received from the selected router, the agent 212, proceeds to decision diamond 352.

In decision diamond 352, it is determined whether a response is received from a router other than the selected router. If all responses are received from the selected router, the agent 212 assumes no load balancing is in effect and, in step 356, instantiates a link between $R_u$ and the selected router and proceeds to step 374 below. If a response is received from a router other than the selected router, a decision must be made as to which of the load-balanced links to follow downstream.

In step 360, the decision as to which link to follow is effected. Although any technique can be used to effect the selection, a preferred technique is to set the downstream router $R_d$ to the interface address of the router generating the most responses to pings in the load balancing test of step 344. In FIG. 6, $R_d$ is set to an interface address associated with $R_2$. In the event of an equal number of responses for each potential router, the router may be selected arbitrarily.

In decision diamond 364, the agent 212 determines whether or not $R_d$ is in the baseline topology 216. If not, the baseline topology is incorrect and the agent proceeds to step

396 and terminates operation. If so, the agent instantiates a link between $R_u$ and $R_d$ in step 366 with a suitable warning indicating that per-destination or per-source/destination load balancing is in effect.

In step 368, all (destination) addresses that failed to return a response from $R_d$ are removed from the set D. In other words with reference to FIG. 6 and assuming that $R_d$ is set to an interface address of $R_2$, the address x.x.x.2 would be removed from the set D.

In step 370, the agent 212 sets the next router interface address to $R_d$ and checks for asymmetry in step 374. As will be appreciated, asymmetric paths can arise in some routing protocols, such as Open Shortest Path First or OSPF, when the metric for one direction of a link is not the same for the reverse direction. This results in packets sent from node A to node B being forwarded through a different set of routers than packets sent from node B to node A. Such paths are undesirable in general for real-time communications, as the delay/packet loss/jitter characteristics for the return path of a packet may be substantially different to that for the outbound path. Detection of asymmetric paths can be performed given access to each router's routing tables. If an outbound path from node A contains a segment between first and second routers, the routing table of the second router is examined to ensure that for packets destined to node A, the next hop is the first router. Accordingly, the agent 212 accesses the baseline topology 216 and finds the entry for the address of agent 212 in the routing table of the selected router.

In decision diamond 378, the agent determines if the next hop address in the entry is the selected router. If not, a warning is added in step 380 to the discovered topology for the selected router indicating that the associated link may be asymmetrical. The agent 212 then proceeds to step 388. If so, the agent proceeds to decision diamond 382.

In decision diamond 382, the agent determines whether the incoming link $R_u$ to the selected router has a warning for load balancing. If so, the agent 212 in step 384 adds a warning indicating that the associated link may be asymmetrical. It is assumed that, when there is load balancing in the downstream direction, it is likely that there will be load balancing in the upstream direction. This gives rise to the possibility of asymmetry, hence the extra warning. Thereafter or if the incoming link has no warning, the agent 212 proceeds to decision diamond 388.

In decision diamond 388, the agent 212 determines whether there is a next router interface address in set D. If so, the agent 212 returns to step 308 and sets the next router address to the entry in set D. If not, the agent proceeds to decision diamond 392.

In decision diamond 392, the agent 212 determines whether there is a next (edge) subnet that has not yet been the subject of load balancing testing. When a next untested subnet exists, the agent 212 returns to step 302 and sets the next subnet S to the untested subnet. When no next untested subnet exists, the agent proceeds to step 394.

In step 394, the agent 212 writes the discovered topology tree to the discovered topology 220 output file(s) and terminates operation in step 396.

A number of variations and modifications of the invention can be used. It would be possible to provide for some features of the invention without providing others.

For example in one alternative embodiment, only a subset of set D is pinged in step 344. Although this reduces network traffic, it can also reduce the chances of detecting subsequent downstream load balancing.

In another alternative embodiment, instead of quitting in decision diamond 364 when $R_d$ is not found in the baseline topology, another downstream router that is included in the baseline topology could be picked for $R_d$.

In yet another alternative embodiment, step 360 could be changed so that instead of following a single downstream link all of the downstream links are followed. This modification would increase coverage of the network but also the complexity of the software.

In a further alternative embodiment, in step 332 instead of instantiating a cloud the topology is "pruned" at the selected router using per-packet load balancing and no tests are performed on components downstream of the "pruned" router. "Pruning" refers to removal of the branch(es) of the tree downstream from a selected point.

In another embodiment, any of the software modules discussed above can be implemented, in whole or part, as an application specific integrated circuit or any other type of logic circuit.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streaming the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for identifying per-packet load balancing, comprising:
   (a) providing a baseline network topology;
   (b) selecting, from the baseline network topology, first and second addresses associated with first and second routers, respectively, wherein the first router has an associated first hop count relative to a selected node and the second router an associated second hop count relative to the selected node and wherein the first hop count is less than the second hop count;
(c) transmitting a plurality of test packets from a common source address to a common selected destination address, each of the test packets having a time to live equal to or greater than the first hop count;
(d) receiving a plurality of responses associated with the test packets; and
(e) applying the following rules:
(E1) when all of the responses are from a common router, concluding that per-packet load balancing is not in effect; and
(E2) when the responses are from different routers, concluding that per-packet load balancing is in effect.

2. The method of claim 1, further comprising:
selecting a subnetwork;
identifying a first set of unique addresses within the selected subnetwork;
creating a second set of unique addresses, wherein the second set is the union of the first set and a third set of router interface addresses associated with routers between the selected node and the selected subnetwork, wherein the first and second addresses are included within the third set.

3. The method of claim 1, further comprising:
determining whether the second address is contactable and wherein the second hop count exceeds the first hop count by one hop.

4. The method of claim 1, wherein the time to live is equal to the second hop count.

5. The method of claim 1, wherein the determining step comprises:
first determining whether per-packet load balancing is in effect; and
second determining whether at least one of per-destination and per-source/destination load balancing is in effect.

6. The method of claim 1, further comprising:
determining whether or not an assymetric link is present between the first and second routers.

7. The method of claim 1, further comprising:
selecting, from the baseline network topology, a third address associated with a third router, wherein the third router has an associated third hop count relative to the selected node and wherein the second hop count is less than the third hop count;
transmitting a plurality of second test packets from the common source address to the common selected destination address, each of the second test packets having a time to live equal to or greater than the third hop count;
receiving a plurality of second responses associated with the second test packets; and
determining, based on the responses, whether per-packet load balancing is in effect at the second router.

8. A computer readable medium containing processor executable instructions operable to perform the steps of claim 1.

9. The method of claim 1, wherein the time to live is incremented to the second hop count and wherein steps (c) through (e) are subsequently repeated with respect to the second router.

10. A method for identifying per-packet load balancing, comprising:
(a) providing a baseline network topology;
(b) selecting, from the baseline network topology, first and second addresses associated with first and second routers, respectively, wherein the first router has an associated first hop count relative to a selected node and the second router an associated second hop count relative to the selected node and wherein the first hop count is less than the second hop count;
(c) transmitting a plurality of test packets from a common source address to a plurality of differing destination addresses, each of the test packets having a time to live equal to or greater than the first hop count;
(d) receiving a plurality of responses associated with the test packets; and
(e) applying the following rules:
(E1) when all of the responses are from a common router, concluding that at least one of per-destination and per-source/destination load balancing is not in effect; and
(E2) when the responses are from different routers, concluding that at least one of per-destination and per-source/destination load balancing is in effect.

11. The method of claim 10, further comprising:
selecting a subnetwork;
identifying a first set of unique addresses within the selected subnetwork;
creating a second set of unique addresses, wherein the second set is the union of the first set and a third set of router interface addresses associated with routers between the selected node and the selected subnetwork, wherein the first and second addresses are included within the third set.

12. The method of claim 10, further comprising:
determining whether the second address is contactable and wherein the second hop count exceeds the first hop count by one hop.

13. The method of claim 10, wherein the time to live is equal to the second hop count.

14. The method of claim 10, wherein step (e) comprises:
first determining whether per-packet load balancing is in effect; and
second determining whether at least one of per-destination and per-source/destination load balancing is in effect.

15. The method of claim 10, further comprising:
determining whether or not and asymetrical link is present between the first and second routers.

16. The method of claim 10, further comprising:
selecting, from the baseline network topology, a third address associated with a third router, wherein the third router has an associated third hop count relative to the selected node and wherein the second hop count is less than the third hop count;
transmitting a plurality of second test packets from the common source address to the plurality of differing destination addresses, each of the second test packets having a time to live equal to or greater than the third hop count;
receiving a plurality of second responses associated with the second test packets; and
determining, based on the responses, whether per-packet load balancing is in effect at the second router.

17. The method of claim 10, wherein the time to live is incremented to the second hop count and steps (c) through (e) are subsequently repeated with respect to the second router.

18. A computer readable medium containing processor executable instructions operable to perform the steps of claim 10.

19. A system for detecting load balancing in a distributed processing network, comprising:
(a) a memory comprising a baseline network topology; and
(b) a processor operable to:

(i) select, from the baseline network topology, first and second addresses associated with first and second routers, respectively, wherein the first router has an associated first hop count relative to a selected node and the second router an associated second hop count relative to the selected node and wherein the first hop count is less than the second hop count;

(ii) transmit first and second sets of test packets, the test packets having a time to live equal to or greater than the first hop count, wherein the first set of test packets are from a common source address to a common selected destination address and the second set of test packets are from a common source address to a plurality of differing destination addresses;

(iii) receive responses to the first and second sets of test packets; and (iv) apply the following rules:
  (A) when all of the responses to the first set of test packets are from a common router, concluding that no per-packet load balancing is in effect;
  (B) when the responses to the first set of test packets are from a different routers, concluding that per-packet load balancing is in effect;
  (C) when all of the responses to the second set of test packets are from a common router, concluding that at least one of per-destination and per-source/destination load balancing load balancing is not in effect;
  (B) when the responses to the second set of test packets are from different routers, concluding that at least one of per-destination and per-source/destination load balancing is in effect.

20. The system of claim 19, wherein the processor is further operable to:
  (v) select a subnetwork;
  (vi) identify a first set of unique addresses within the selected subnetwork;
  (vii) create a second set of unique addresses, wherein the second set is the union of the first set and a third set of router interface addresses associated with routers between the selected node and the selected subnetwork, wherein the first and second addresses are included within the third set.

21. The system of claim 19, wherein the processor is further operable to:
  (v) determine whether the second address is contactable and wherein the second hop count exceeds the first hop count by one hop.

22. The system of claim 19, wherein the time to live is incremented to equal the second hop count and operations (ii)-(iv) repeated using the incremented time to live.

23. The system of claim 19, wherein the processor is operable to conclude that at least one of per-destination and per-source/destination load balancing is in effect when the test packets have a common source address but differing destination addresses and at least two different routers responded to the test packets.

24. The system of claim 19, wherein the processor is operable in operation (iv) to:
  (a) first determine whether per-packet load balancing is in effect; and
  (b) second determine whether at least one of per-destination and per-source/destination load balancing is in effect.

25. The system of claim 24, wherein the processor is further operable to:

(v) determine whether or not asymmetry is present between the first and second routers.

26. The system of claim 19, wherein the time to live is incremented to the second hop count and operations (ii) through (iv) are subsequently repeated with respect to the second router.

27. The system of claim 19, wherein the process is further operable to:
  (v) select the second address, the second address being logically adjacent to the first address;
  (vi) access at least one router table;
  (vii) select a first link positioned logically between the first and second addresses; and
  (viii) apply the following rules:
    when the first link has differing metrics for differing directions of traversing the first link, the first link is deemed to be asymmetric;
    when packets have differing hops when traversing the first link in differing directions, the first link is deemed to be asymmetric.

28. A method, comprising:
  (a) providing a set of device addresses associated with a plurality of routers, the plurality of routers being interposed between a testing node and a selected network object;
  (b) selecting, from the set of device addresses, a first device address, wherein the first device address is a first hop count from the testing node and a second device address, in the set of device addresses, is a second hop count from the testing node and wherein the first hop count is less than the second hop count;
  (c) transmitting a first set of test packets to at least one of (i) the first device address and (ii) one or more selected destination addresses, each member of the first set of test packets having a Time To Live ("TTL") equal to or greater than the first hop count, wherein the test device on the one hand and the one or more selected destination addresses on the other are located logically on either side of the first device address;
  (d) transmitting a second set of test packets to multiple destination addresses, each member of the second set of test packets having a TTL equal to or greater than the first hop count, wherein the test device on the one hand and each of the multiple destination addresses on the other are located logically on either side of the first device address;
  (e) receiving a plurality of responses to the first and second sets of test packets;
  (f) applying the following rules:
    (F1) when all of the responses to the first set of test packets are from a router associated with the selected device address, concluding that per-packet load balancing is not in effect;
    (F2) when one or more of the responses to the first set of test packets are from a router other than the router associated with the selected device address, concluding that per-packet load balancing is in effect;
    (F3) when all of the responses to the second set of test packets are from the router associated with the selected device address, concluding that at least one of per-destination and per-source/destination load balancing is not in effect;
    (F4) when one or more of the responses to the second set of test packets are from a router other than the router associated with the selected device address, concluding that at least one of per-destination and per-source/destination load balancing is in effect; and (g) updating a network topology to reflect the results of steps (e) and (f).

29. The method of claim 28, wherein a device address is at least one of a router and a router interface and wherein step (a) comprises:
   (A1) selecting, from a network object set comprising a plurality of network object addresses corresponding to a plurality of network objects, a first network object address associated with a first network address;
   (A2) generating a set E comprising device addresses associated with routers logically located in the first network object and a device address of a router logically adjacent the first network object; and
   (A3) generating a set D comprising device addresses in set E and device addresses located between the testing node and the first network object, wherein the set of device address in step (a) is set D.

30. The method of claim 28, wherein, after step (b), the first device address is pinged to determine if the first device address is valid and, when the first device address is not valid, steps (c) and (d) are not performed.

31. The method of claim 28, wherein the TTL is equal to the first hop count and wherein the at least one of (i) the first device address and (ii) one or more selected destination addresses is (i) the first device address.

32. The method of claim 28, wherein the plurality of test packets have a common destination address and TTL, and wherein the common destination address is an edge subnet address.

33. The method of claim 32, further comprising:
   (h) determining whether an asymmetric link is located between the testing node and the one or more selected destination addresses.

34. The method of claim 33, wherein step (h) comprises the substeps:
   (H1) selecting a second device address logically adjacent to the first device address;
   (H2) accessing at least one router table;
   (H3) selecting a first link positioned logically between the testing node and second device address; and
   (H3) applying the following rules:
      (H3i) when the first link has differing metrics for differing directions of traversing the first link, the first link is deemed to be asymmetric;
      (H3ii) when packets have differing hops when traversing the first link in differing directions, the first link is deemed to be asymmetric.

35. The method of claim 28, wherein in step (f) it is first determined whether per-packet load balancing exists and second whether at least one of per-destination and per-source/destination load balancing exists.

36. The method of claim 28, wherein the TTL is incremented to the second hop count and wherein steps (c) through (h) are subsequently repeated with respect to second device address.

37. A computer readable medium containing processor executable instructions operable to perform the steps of claim 28.

* * * * *